US012748950B2

(12) United States Patent
Yuan et al.

(10) Patent No.: US 12,748,950 B2
(45) Date of Patent: Sep. 29, 2026

(54) REVERSE REINFORCEMENT LEARNING TO TRAIN TRAINING DATA FOR NATURAL LANGUAGE PROCESSING NEURAL NETWORK

(71) Applicant: INTERNATIONAL BUSINESS MACHINES CORPORATION, Armonk, NY (US)

(72) Inventors: Zhong Fang Yuan, Xi'an (CN); Tong Liu, Xi'an (CN); Wen Wang, Beijing (CN); Hai Bo Zou, Xi'an (CN); Xiang Yu Yang, Shaanxi (CN)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 17/808,511

(22) Filed: Jun. 23, 2022

(65) Prior Publication Data

US 2023/0419077 A1 Dec. 28, 2023

(51) Int. Cl.
*G06N 3/045* (2023.01)
*G06F 40/20* (2020.01)
*G06N 3/08* (2023.01)

(52) U.S. Cl.
CPC ............. *G06N 3/045* (2023.01); *G06F 40/20* (2020.01); *G06N 3/08* (2013.01)

(58) Field of Classification Search
CPC .......... G06N 3/045; G06N 3/08; G06N 3/006; G06N 3/044; G06N 3/047; G06N 3/084; G06N 7/01; G06F 40/20
See application file for complete search history.

(56) References Cited

U.S. PATENT DOCUMENTS

2015/0100530 A1 4/2015 Mnih et al.
2019/0332938 A1 10/2019 Gendron-Bellemare et al.
2021/0034973 A1 2/2021 Xu et al.

FOREIGN PATENT DOCUMENTS

CN 104657745 A 5/2015
CN 112717415 A 4/2021
(Continued)

OTHER PUBLICATIONS

Wang, Dongyang, Junli Su, and Hongbin Yu. "Feature extraction and analysis of natural language processing for deep learning English language." IEEE Access 8 (2020): 46335-46345. https://ieeexplore.ieee.org/stamp/stamp.jsp?tp=&arnumber=8999624 (Year: 2020).*
(Continued)

*Primary Examiner* — Michael H Hoang
(74) *Attorney, Agent, or Firm* — Harrity & Harrity, LLP

(57) ABSTRACT

A computer-implemented process for modifying a training dataset includes the following operations. The training dataset is benchmarked using a State Of The Art (SOTA) neural network to determine a benchmark for the training dataset. The training set is divided into a plurality of slices. A sequence of a plurality of atomic operations are selected using a selection strategy generator operating on one of the plurality of slices. The sequence of the plurality of atomic operations is applied to modify the one of the plurality of slices to generate a revised one of the plurality of slices. Reverse reinforcement learning is performed on the revised one of the plurality of slices using the benchmark and the SOTA neural network. The training dataset is modified by replacing the one of the plurality of slices with the revised one of the plurality of slices to generate a modified training dataset.

20 Claims, 11 Drawing Sheets

(56) References Cited

FOREIGN PATENT DOCUMENTS

| | | | | |
|---|---|---|---|---|
| CN | 115688734 A | * | 2/2023 |
| WO | 2021120951 A1 | | 6/2021 |

OTHER PUBLICATIONS

Kasner, Zdenk. "Domain adaptation for natural language generation." Tiny Transactions of Computer Science (2020). https://ufal.mff.cuni.cz/~zabokrtsky/pgs/thesis_proposal/zdenek-kasner-proposal.pdf (Year: 2020).*

Chen, Tianshui, et al. "Neural task planning with and-or graph representations." IEEE Transactions on Multimedia 21.4 (2018): 1022-1034. https://ieeexplore.ieee.org/stamp/stamp.jsp?tp=&arnumber=8466609 (Year: 2018).*

Zoph, Barret, and Quoc V. Le. "Neural architecture search with reinforcement learning." arXiv preprint arXiv:1611.01578 (2016). https://arxiv.org/pdf/1611.01578 (Year: 2017).*

Hu, Z. et al., "A dynamic adjusting reward function method for deep reinforcement learning with adjustable parameters," Mathematical Problems in Engineering, Nov. 23, 2019.

Zhou, L, et al., "Inverse reinforcement learning with natural language goals," In Proceedings of the AAAI Conference on Artificial Intelligence, May 18, 2021, vol. 35, No. 12, pp. 11116-11124.

Mell, P. et al., The NIST Definition of Cloud Computing, National Institute of Standards and Technology, U.S. Dept. of Commerce, Special Publication 800-145, Sep. 2011, 7 pg.

* cited by examiner

REVERSE REINFORCEMENT LEARNING TO TRAIN TRAINING DATA FOR NATURAL LANGUAGE PROCESSING NEURAL NETWORK

BACKGROUND

The present invention relates to natural language processing using a neural network, and more specifically, to employing reverse reinforcement learning to train training data for use with the neural network.

Natural Language Processing (NLP) is a field of computer science and linguistics concerned with the interactions between computers and human (natural) languages. NLP as a field of computer science began as a branch of artificial intelligence. Modern NLP algorithms are grounded in machine learning (ML) and include both statistical methods and neural networks. As used herein, a "NLP agent" is a special-purpose computer system including both hardware and software utilizing NLP algorithms that are configured to process electronic documents by performing natural language processing and analysis of natural language data extracted from the electronic documents.

Artificial neural networks (also referred to herein as neural network) are a common implementation employed by a NLP agent. Many different types of neural networks exist for NLP. A neural network that achieves performance/results (e.g., accuracy, speed, or other desired metric) for a particular task that exceeds the performance/results of other neural networks is determined to be State Of The Art (SOTA). Notably, a neural network being SOTA is task dependent. For example, a particular neural network may be SOTA in translating English poetry into Chinese. However, if a different dataset is employed (e.g., English 19th century literature instead of English poetry) such that the task differs (i.e., translating English 19th century literature into Chinese), the particular neural network may no longer be SOTA. In this situation, there is a need to make the particular neural network SOTA again.

SUMMARY

A computer-implemented process for modifying a training dataset includes the following operations. The training dataset is benchmarked using a State Of The Art (SOTA) neural network to determine a benchmark for the training dataset. The training set is divided into a plurality of slices. A sequence of a plurality of atomic operations are selected using a selection strategy generator operating on one of the plurality of slices. The sequence of the plurality of atomic operations is applied to modify the one of the plurality of slices to generate a revised one of the plurality of slices. Reverse reinforcement learning is performed on the revised one of the plurality of slices using the benchmark and the SOTA neural network. The training dataset is modified by replacing the one of the plurality of slices with the revised one of the plurality of slices to generate a modified training dataset.

In other aspects of the process, the reverse reinforcement learning includes the SOTA neural network being an environment, the modifying the one of the plurality of slices being an action, and a reward is based upon the benchmark. The selection strategy generator includes a long short term memory (LSTM) neural network and a conditional random field (CRF) layer. The sequence of the plurality of atomic operations generated by the selection strategy generator includes at least one of the group consisting of: a mask atomic operation and an out of order atomic operation. Also, the sequence of the plurality of atomic operations generated by the selection strategy generator includes at least one of the group consisting of: a data deletion atomic operation, a data copy atomic operation, and a hidden layer transition atomic operation. The performing the reverse reinforcement learning is performed for a plurality of iterations. The modified training dataset is used to train the SOTA neural network. The plurality of slices includes more than two slices, and at least two of the plurality of slices are modified and one of the plurality of slices is unmodified.

A computer hardware system for modifying a training dataset includes a hardware processor configured to perform the following executable operations. The training dataset is benchmarked using a State Of The Art (SOTA) neural network to determine a benchmark for the training dataset. The training set is divided into a plurality of slices. A sequence of a plurality of atomic operations are selected using a selection strategy generator operating on one of the plurality of slices. The sequence of the plurality of atomic operations is applied to modify the one of the plurality of slices to generate a revised one of the plurality of slices. Reverse reinforcement learning is performed on the revised one of the plurality of slices using the benchmark and the SOTA neural network. The training dataset is modified by replacing the one of the plurality of slices with the revised one of the plurality of slices to generate a modified training dataset.

In other aspects of the hardware system, the reverse reinforcement learning includes the SOTA neural network being an environment, the modifying the one of the plurality of slices being an action, and a reward is based upon the benchmark. The selection strategy generator includes a long short term memory (LSTM) neural network and a conditional random field (CRF) layer. The sequence of the plurality of atomic operations generated by the selection strategy generator includes at least one of the group consisting of: a mask atomic operation and an out of order atomic operation. Also, the sequence of the plurality of atomic operations generated by the selection strategy generator includes at least one of the group consisting of: a data deletion atomic operation, a data copy atomic operation, and a hidden layer transition atomic operation. The performing the reverse reinforcement learning is performed for a plurality of iterations. The modified training dataset is used to train the SOTA neural network. The plurality of slices includes more than two slices, and at least two of the plurality of slices are modified and one of the plurality of slices is unmodified.

A computer program product includes a computer readable storage medium having stored therein program code for modifying a training dataset. The program code, which when executed by a computer hardware system, cause the computer hardware system to perform the following. The training dataset is benchmarked using a State Of The Art (SOTA) neural network to determine a benchmark for the training dataset. The training set is divided into a plurality of slices. A sequence of a plurality of atomic operations are selected using a selection strategy generator operating on one of the plurality of slices. The sequence of the plurality of atomic operations is applied to modify the one of the plurality of slices to generate a revised one of the plurality of slices. Reverse reinforcement learning is performed on the revised one of the plurality of slices using the benchmark and the SOTA neural network. The training dataset is modified by replacing the one of the plurality of slices with the revised one of the plurality of slices to generate a modified training dataset.

In other aspects of the computer program product, the reverse reinforcement learning includes the SOTA neural network being an environment, the modifying the one of the plurality of slices being an action, and a reward is based upon the benchmark. The selection strategy generator includes a long short term memory (LSTM) neural network and a conditional random field (CRF) layer. The sequence of the plurality of atomic operations generated by the selection strategy generator includes at least one of the group consisting of: a mask atomic operation and an out of order atomic operation. Also, the sequence of the plurality of atomic operations generated by the selection strategy generator includes at least one of the group consisting of: a data deletion atomic operation, a data copy atomic operation, and a hidden layer transition atomic operation. The performing the reverse reinforcement learning is performed for a plurality of iterations. The modified training dataset is used to train the SOTA neural network. The plurality of slices includes more than two slices, and at least two of the plurality of slices are modified and one of the plurality of slices is unmodified.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

The present disclosure is directed to modifying a training dataset as part of training a neural network. The training dataset is benchmarked using a State Of The Art (SOTA) neural network to determine a benchmark for the training dataset. As used herein, a neural network may be deemed to be SOTA as a result of the neural network being commonly understood to be more reliable, more precise, more stable, faster, or the like as compared to conventional neural networks as a result of the SOTA neural network incorporating relatively new technology or techniques (e.g., newer than many widely used conventional neural network technology or techniques). As used herein, a SOTA neural network should not be understood as being a neural network that exclusively (or primarily) uses cutting-edge techniques, and/or a neural network that actually is more reliable/precise/stable/fast as compared to conventional neural networks.

A sequence of a plurality of atomic operations is selected using a selection strategy generator operating on one of a plurality of slices of the training dataset. The sequence of the plurality of atomic operations is then applied to modify the one of the plurality of slices to generate a revised one of the plurality of slices. Reverse reinforcement learning is performed on the revised one of the plurality of slices using the benchmark and the SOTA neural network. The training dataset is then modified by replacing the one of the plurality of slices with the revised one of the plurality of slices to generate a modified training dataset. This approach advantageously makes the modified training dataset more compatible with the SOTA neural network. Also, the modified dataset has stronger interpretability, which refers to how easy it is to understand which types of data are better suited to which neural networks. Although the present approach is described as used with neural networks for natural language processing, the described approach can also be used for other types of neural networks, such as those used for computer vision.

Figure 1:
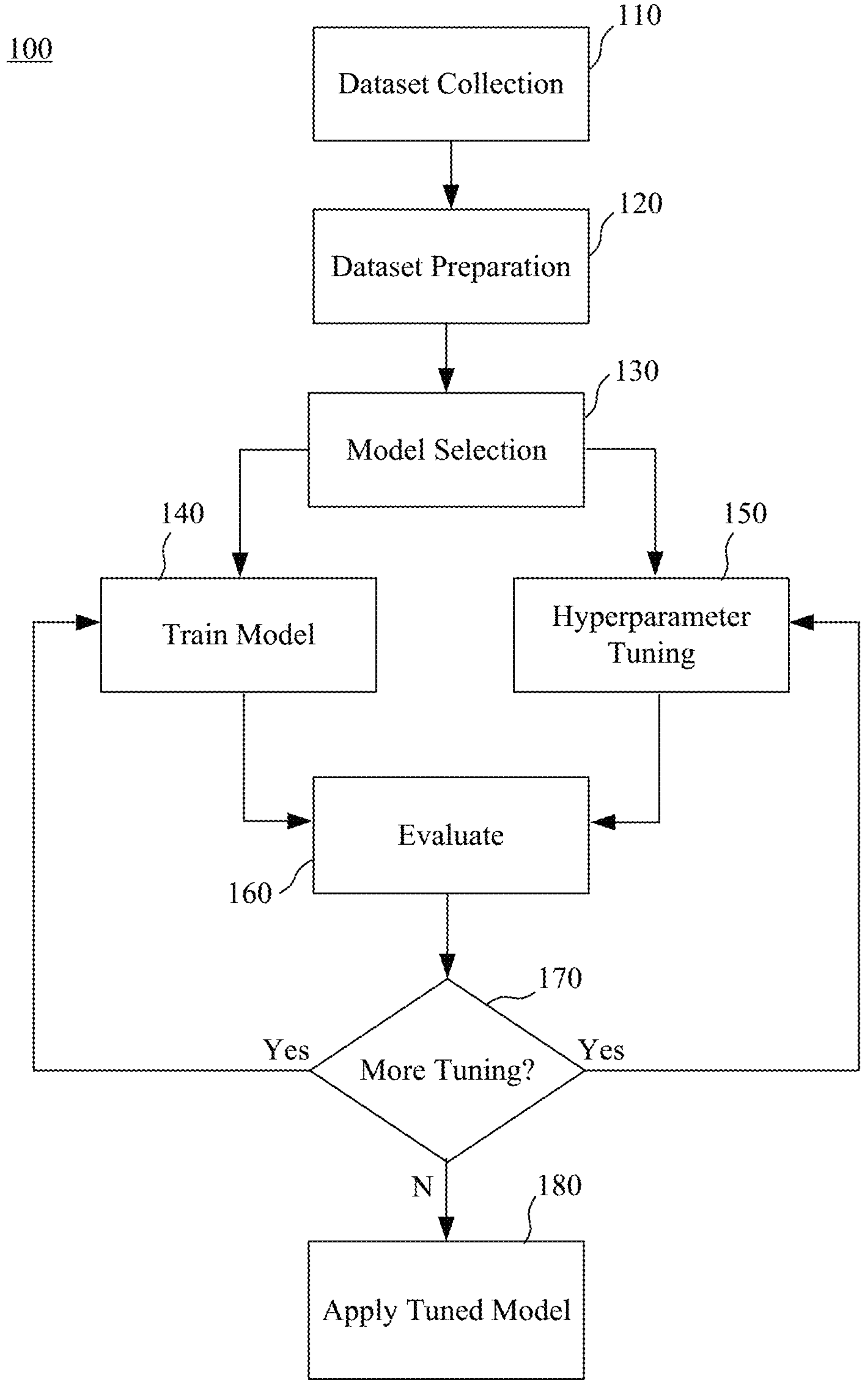
FIG. 1 is a flowchart of a typical reinforced learning (RL) approach.

With reference to FIG. 1, a generic process 100 for machine learning is disclosed. In 110, the data used for the dataset is collected. As conventionally known, the quality of the machine learning model (e.g., a neural network) being trained is dependent upon the quantity and quality of the data in the dataset. In 120, the data in the dataset is prepared, and this may involve a wide variety of different operations. For example, if the data comes from different sources, the data may require normalization and data type conversions. Also, duplicate data may be removed and errors/omissions in the data may be corrected. The data can also be randomized to reduce the impact of the particular order in which the data is collected and/or prepared.

The dataset can also be split up into multiple portions. One portion of the dataset (referred to herein as the training dataset), typically the largest portion, is used to train the model (e.g., tune the parameters of the model). Another portion of the dataset (referred to herein as the test dataset) is used to validate the final trained model. Still another portion of the dataset (referred to herein as the validation dataset) is used to tune hyperparameters. In other instances, k-fold cross-validation can be used in place of a test and/or validation dataset—particularly in situations in which the amount of data is limited.

In 130, the model to be trained is selected. There are a number of known models that can be used with machine learning. A non-exclusive list of these models includes linear regression, Deep Neural Networks (DNN), logistic regression, decision trees, Linear Discriminant Analysis (LDA), Support Vector Machines (SVM), and K-nearest Neighbors (kNN). Depending upon the type of solution needed for a particular application, one or more models may be better suited. For example, a DNN is known to provide good results for image recognition. As another example, models typically used for NLP include Bidirectional Encoder Representations from Transformers (BERT) and Generative Pre-trained Transformer (GPT).

In 140, the parameters of the model are tuned. There are many different types of known techniques used to train a model. Some of these techniques are discussed in further detail with regard to FIGS. 2A-2B. In 150, hyperparameters can be tuned. Hyperparameters are variables that govern the training process itself and differ from input data (i.e., the training data) and the parameters of the model. Examples of hyperparameters include, for example, the number of hidden layers in a DNN between the input layer and the output layer. Other examples include number of training steps, learning rate, and initialization values. In certain instances, the validation dataset can be used as part of this tuning process. Although illustrated as being separate from the tuning of the parameters of model in 150, the tuning of the hyperparameters can be performed in parallel with or incorporated with the tuning of the parameters of the model in 140.

In 160, the parameters of the model and the hyperparameters are evaluated. This typically involves using some metric or combination of metrics to generate an objective descriptor of the performance of the model. The evaluation typically uses data that has yet to be seen by the model (e.g., the test dataset). The operations of 140-160 continue until a determination, in 170, that no additional tuning is to be performed. In 180, the tuned model is applied to real-world data.

Figure 2A:
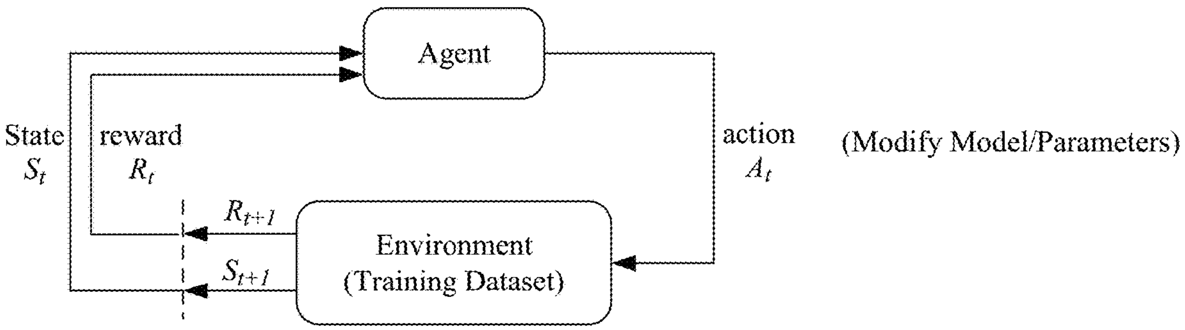
FIGS. 2A and 2B are block diagrams respectively schematically illustrating a reinforced learning (RL) approach and a deep Q-learning approach (DQN).

Machine learning paradigms include supervised learning (SL), unsupervised learning (UL), and reinforced learning (RL). RL differs from SL by not requiring labeled input/output pairs and not requiring sub-optimal actions to be explicitly corrected. FIG. 2A schematically illustrates a generic RL approach. In describing RL, the following terms are oftentimes used. The "environment" refers to the world in which the agent operations. The "State" ($S_t$) refers to a current situation of the agent. Each State ($S_t$) may have one or more dimensions that describe the State. The "reward" ($R_t$) is feedback from the environment (also illustrated as "r" in FIG. 2B), which is used to evaluate actions ($A_t$) taken by the agent. In other words a reward function, which is part of the environment, generates the reward ($R_t$), and the reward function reflects the desired goal of the model being trained. The "policy" is a methodology by which to map the State ($S_t$) of the agent to certain actions ($A_t$). The "value" is a future reward received by an agent by taking an action ($A_t$) in a particular State ($S_t$). Ultimately, the goal of the agent is to generate actions ($A_t$) that maximize the reward function.

Figure 2B:
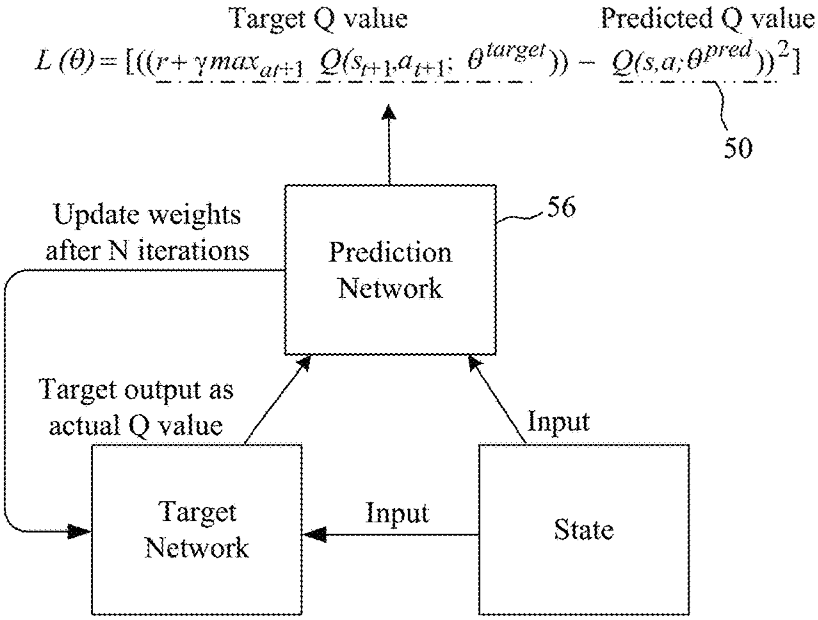

Examples of RL algorithms that may be used include Markov decision process (MDP) (i.e., the methodology illustrated in FIG. 2A), Monte Carlo methods, temporal difference learning, Q-learning, Deep Q Networks (DQN), State-Action-Reward-State-Action (SARSA), a distributed cluster-based multi-agent bidding solution (DCMAB), and the like. FIG. 2B illustrates one example of the operation of a DQN model. DQN is a combination of deep learning (i.e., neural network based) and reinforced learning. Deep learning is another subfield of machine learning that involves artificial neural networks. An example of a computer system that employs deep learning is IBM's Watson. While the terms "neural network" and "deep learning" are oftentimes used interchangeably, by popular convention, deep learning (e.g., with a DNN), refers to a neural network with more than three layers inclusive of the inputs and the output. A neural network with just two or three layers is considered just a basic neural network.

A neural network can be seen as a universal functional approximator that can be used to replace the Q-table used in Q-learning. In a DQN model, the loss function 50 is represented as a squared error of the target Q value and prediction Q value. Error is minimized by optimizing the weights, θ. In DQN, two separate networks (i.e., target network 54 and prediction network 56 having the same architecture) can be respectively employed to estimate target and prediction Q values based upon state 52. The result from the target model is treated as a ground truth for the prediction network 56. The weights for the prediction network 56 get updated every iteration and the weights of the target network 54 get updated with the prediction network 56 after N iterations.

Figure 2C:
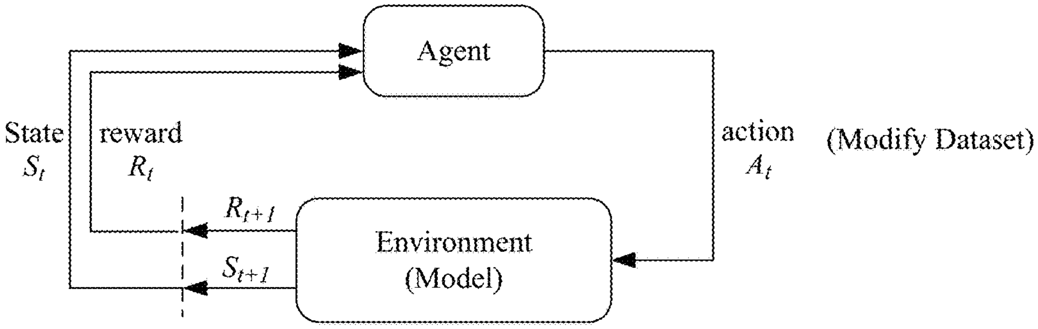
FIG. 2C is a block diagram schematically illustrating a reverse RL approach according to an aspect of the present invention.

Referring to FIG. 2C, a modification of the conventional RL approach of FIG. 2A is illustrated. Specifically, the conventional RL approach has the training dataset as a stable and unchanging environment, and the action $A_t$ involves various modification of the parameters of the model being trained. However, the innovative modified RL approach of FIG. 2C (hereinafter referred to a reverse RL) employs the model as the stable and unchanging environment with the assumption that the model is State of the Art (SOTA). In this situation, the action $A_t$ of the reverse RL involves the modification of the training dataset using strategies 505 generated by a selection strategy generator 400 as further discussed with regard to FIGS. 3 and 4.

Figure 3:
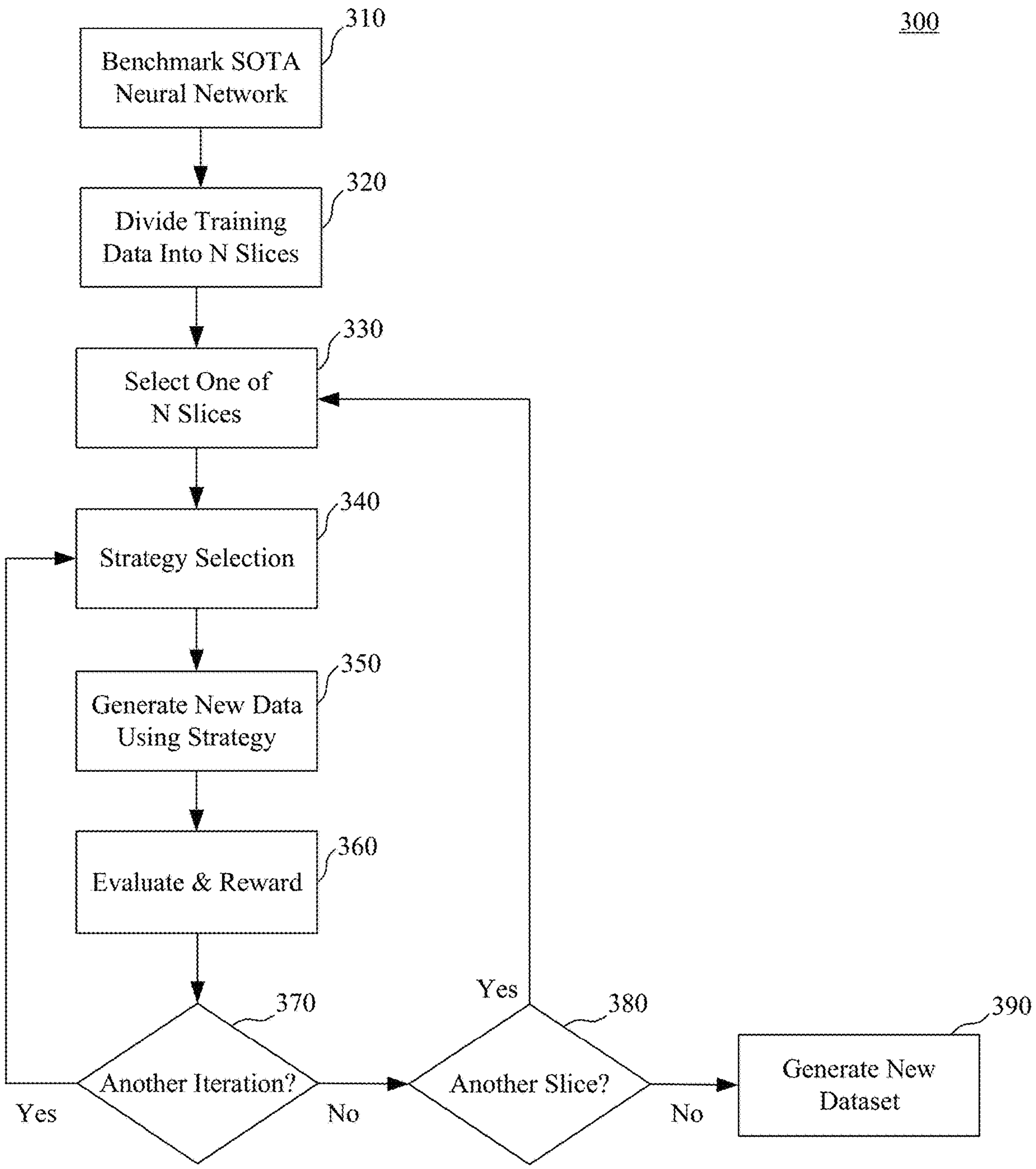
FIG. 3 is a flowchart of an example method employing the reverse RL approach of FIG. 2C according to an embodiment of the present invention.
Figure 4:
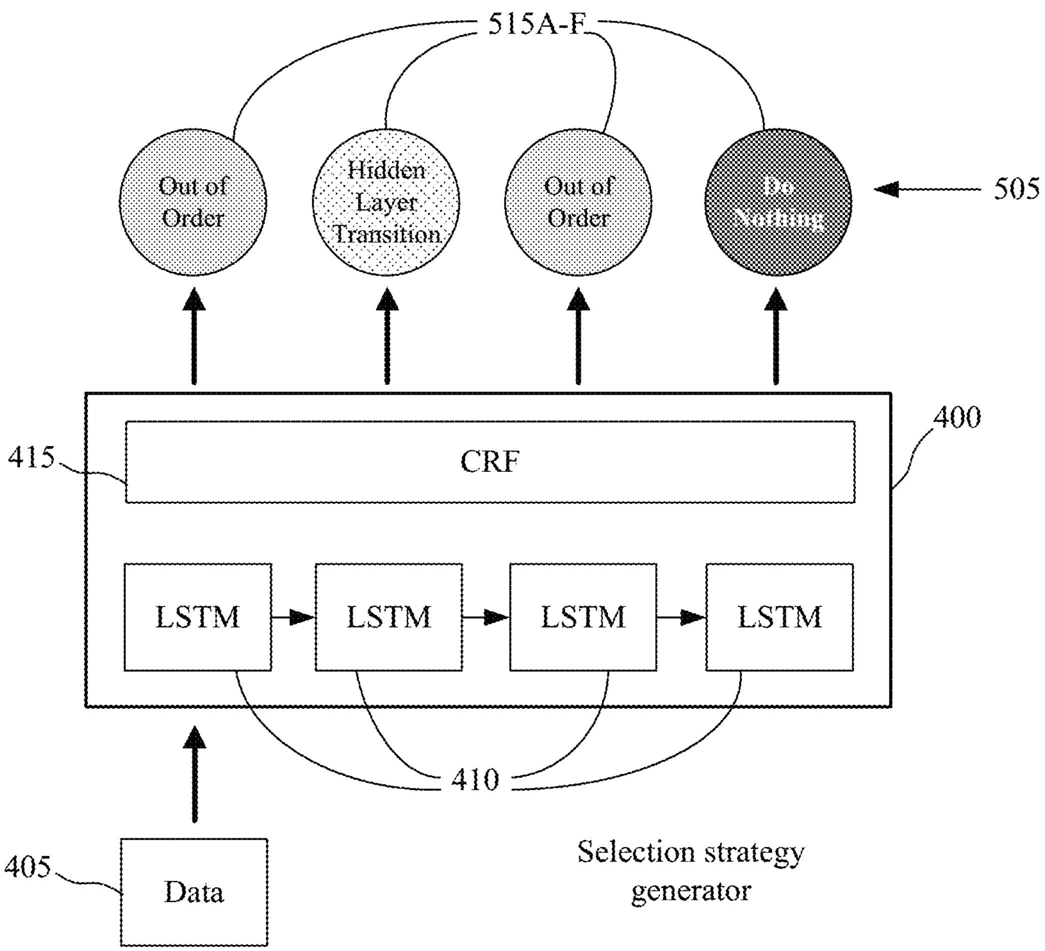
FIG. 4 is a block diagram illustrating a selection strategy generator according to an embodiment of the present invention.

FIGS. 3 and 4 respectively illustrate a methodology 300 and architecture 400 for modifying a training dataset 405. In 310, a neural network previously-determined to be SOTA using a different dataset is identified and used to benchmark the training dataset 405. Many types of benchmarks are known, the process 300 is not limited as to a particular type of benchmark. In certain aspects, an accuracy of the SOTA neural network using the training dataset 405 is used as the benchmark. Although not limited to this particular technique, one benchmark technique for determining accuracy is as a percentage of predictions where the predicted value is equal to the true value versus the total number of predictions. In 320, the training dataset 405 is divided into N number of slices. The N number is typically empirically specified and usually a multiple of 5.

In 330, one of the N slices of the training dataset 405 is selected. Operations 340-370 refer to the reverse reinforcement learning process discussed above with regard to FIG. 2C. In 340, a selection strategy 505 is selected using the selection strategy generator as further discussed with regard to FIGS. 5A-5B. This selection strategy 505 is then applied to the N slice of the training dataset 405 that was previously selected to generate a revised slice of the training dataset 405. This constitutes the action ($A_t$) of the reverse RL approach illustrated in FIG. 2C.

In 360, the new data is operated upon by the SOTA neural network and a reward ($R_t$) is generated based upon the accuracy of the SOTA neural network. Many types of reward functions are known to be used in RL, and the present system employing reverse RL is not limited as to a particular reward function. However, in certain aspects, the reward function involves having the reward ($R_t$) be the accuracy of the new data subtracted by the accuracy of the benchmark calculated in 310. Alternatively, the reward function could be replaced by the loss function of a native neural network. This process is repeated until, at 370, a determination is made that no additional iterations of the process need be performed.

In 380, a determination is made whether any additional ones of the N slices will be selected. If yes, the process 300 proceeds back to 330 in which one of the plurality of N slices is selected. If no, the process 300 proceeds to 390. One of the plurality of N slices can be selected not to be modified as part of the reverse RL process and can be subsequently used as the test dataset and/or the validation dataset.

In 390, a new training dataset is generated by replacing each of the N slices with their respective revised slice generated by the reverse RL process. The new training dataset can then be used to train the SOTA neural network as discussed in FIG. 1.

Figure 5A:
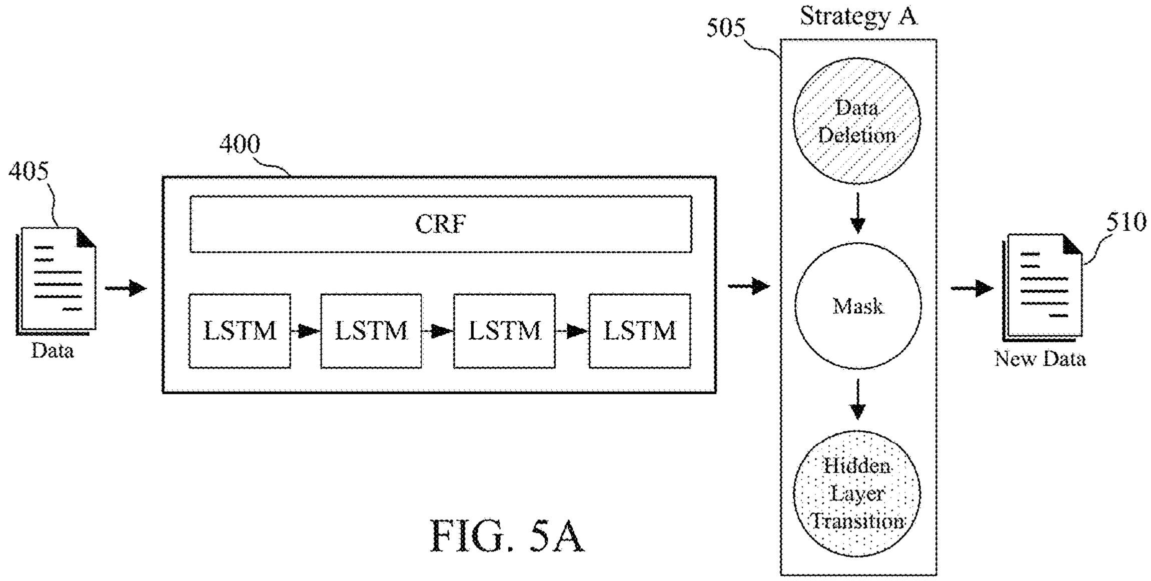
FIGS. 5A and 5B schematically illustrate the usage of the selection strategy generator of FIG. 4 according to an embodiment of the present invention.
Figure 5B:
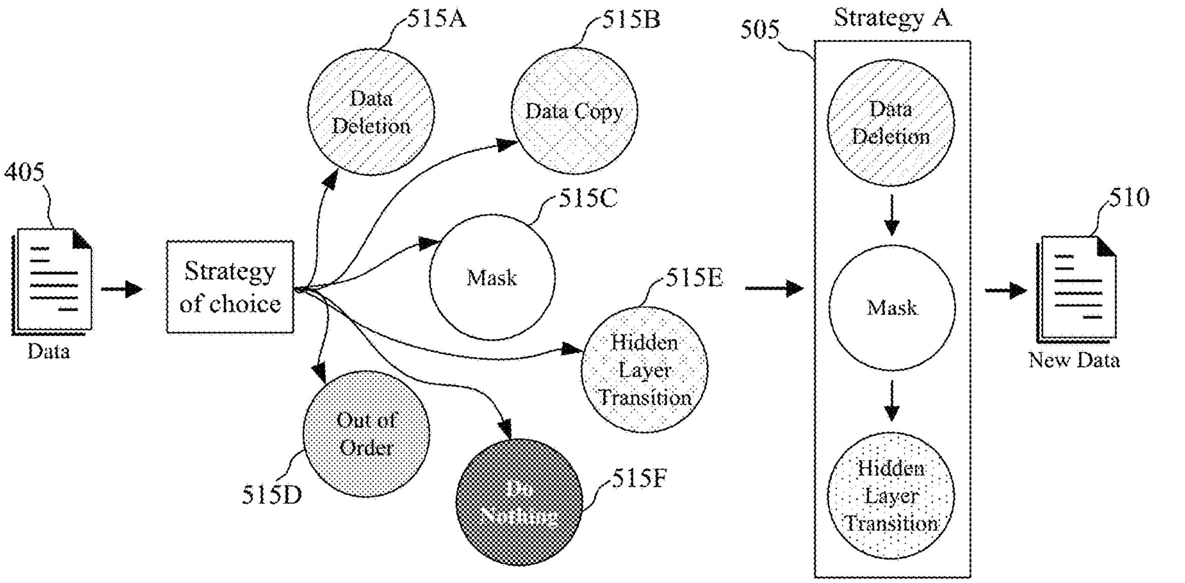

FIGS. 4 and 5A-5B schematically illustrates a selection strategy generator 400 used to generate a new training dataset 510 from the initial training dataset 405. In certain aspects, the selection strategy generator 400 is a sequence generation network based upon Long Short-Term Memory (LSTM) and Conditional Random Field (CRF). LSTM is a specific recurrent neural network (RNN) architecture capable of learning order dependence in sequence prediction problems and designed to model temporal sequences and their long-range dependencies more accurately than conventional RNNs. CRF is generally describes a class of statistical modeling methods used for structured prediction that can take context into account. Using a CRF layer 415 on top of the LSTM 410, the selection strategy generator can generate a strategy 505 of data manipulation that consists of series of multiple atomic operations 515A-515F having variable length. In certain aspects, the number of atomic operations 515A-515F within the strategy are determined by a state transition matrix in the CRF layer 415.

FIGS. 6A-6E illustrate types of atomic operations 515A-E that can be used as part of the transformation/modification strategy employed by the selection strategy generator 400. Although five such atomic operations 515A-E are disclosed, more are possible. For example, as discussed above, Do Nothing 515F is another possible atomic operation and simulates a situation in which the data does not change.

Figure 6A:
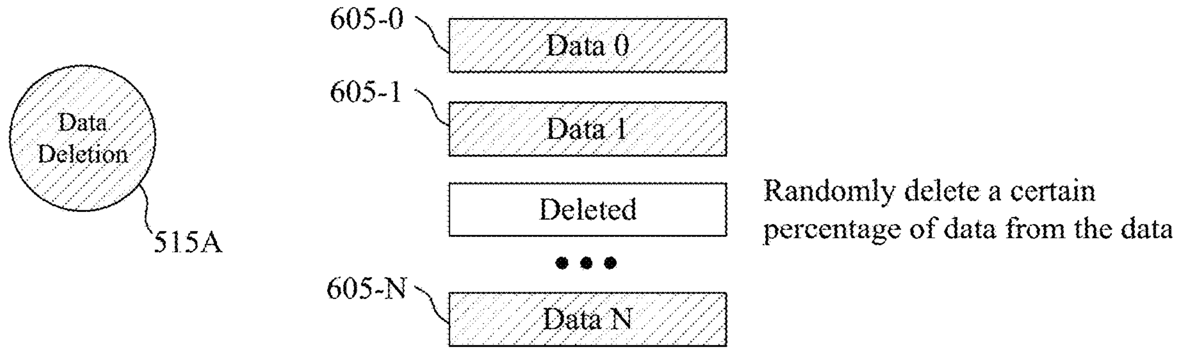
FIGS. 6A-E illustrate different types of atomic operations selected by the selection strategy generator of FIG. 4 according to an aspect of the present invention.

FIG. 6A illustrates the atomic operation of Data Deletion 515A. In Data Deletion 515A, a certain percentage of the data elements (605-0 through 605-N) are deleted from the dataset. This certain percentage is not limited to a particular percentage and can vary. In other instances, the certain percentage is predefined. In still other instances, the certain percentage can randomly vary. Through testing, an effective percentage of data elements being deleted is approximately 20%.

Figure 6B:
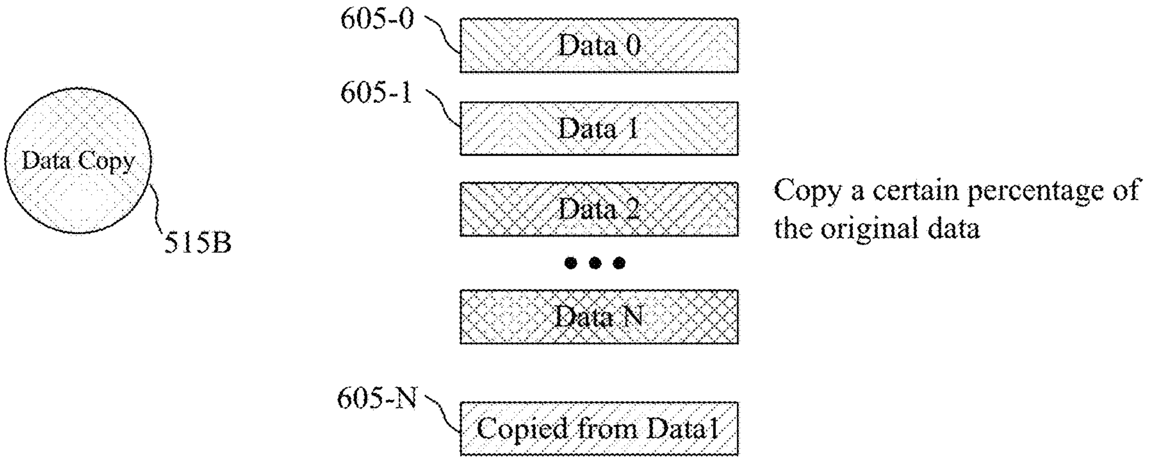

FIG. 6B illustrates the atomic operation of Data Copy 515B. In Data Copy 515B, a certain percentage of the data elements (605-0 through 605-N) in the dataset are copied and become part of the dataset. This certain percentage is not limited to a particular percentage and can vary. In other instances, the certain percentage is predefined. In still other instances, the certain percentage can randomly vary. Through testing, an effective percentage of data elements being copied is approximately 20%.

Figure 6C:
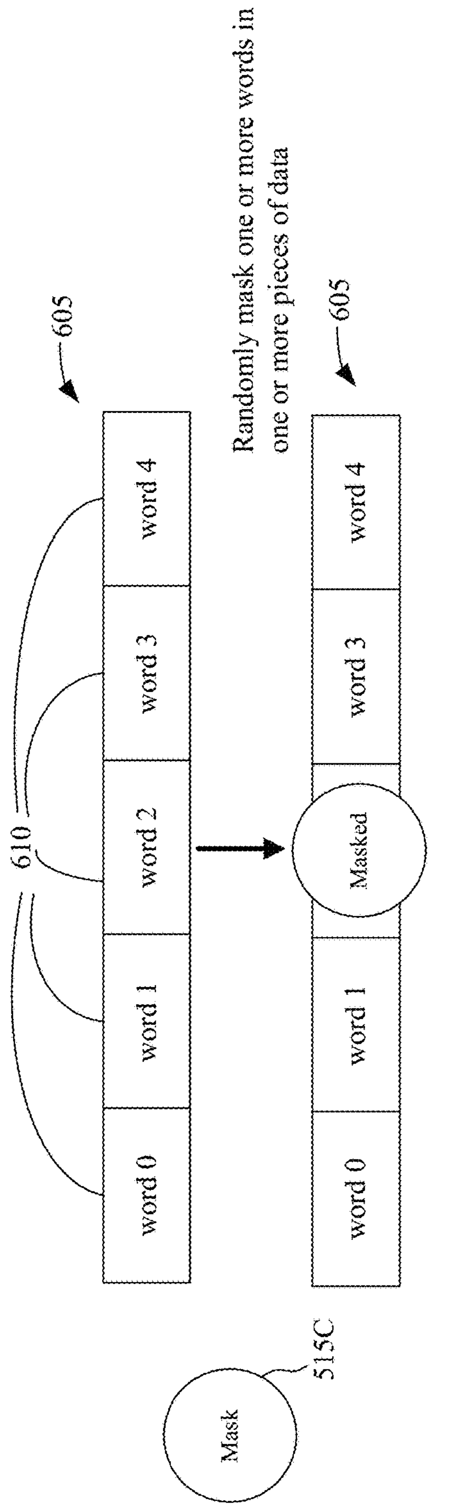

FIG. 6C illustrates the atomic operation of Mask 515C. In natural language processing, a data element 610 will consist of a plurality of discrete elements (i.e., words) 610. In the Mask 515C atomic operation, one or more of the words 610 of a particular data element 610 are masked. The number of words 610 being masked can be random. By way of example and as illustrated, a single word (i.e., "word 2") is masked. By masking the word 610, the word 610 is essentially deleted from the data element 605 and will not be processed as part of the reverse reinforcement learning. Many types of masking techniques are capable of being used, and the Mask 515C atomic operation is not limited as to a particular type. For example, BERT is one approach that can be used as the Mask 515C atomic operation.

Figure 6D:
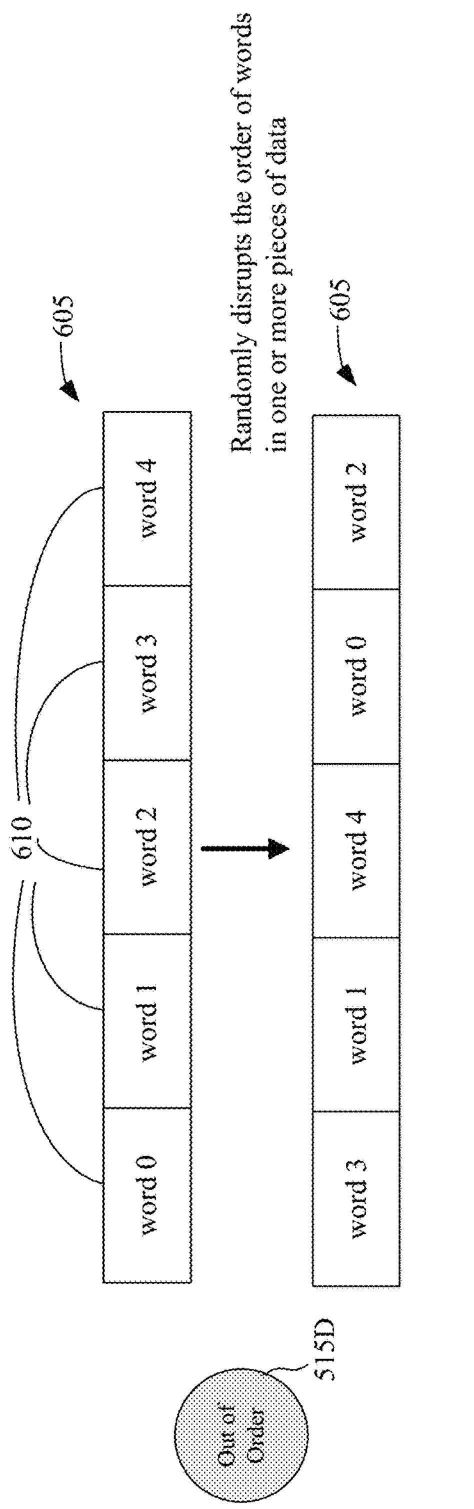

FIG. 6D illustrates the atomic operation of Out of Order 515D. Similar to Mask 515C, in Out of Order 515D, a data element 610 will consist of a plurality of discrete elements (i.e., words) 610. In Out of Order, however, the individual words 610 of the data element 610 are randomly reordered. In certain aspects, two or more word locations are randomly selected, and the words in those locations are reordered. The Out of Order 515D atomic operation is not limited as to a particular type of reordering. For example, each word in the selected word operations could be moved one place to the right, moved one place to the left, or randomly.

Figure 6E:
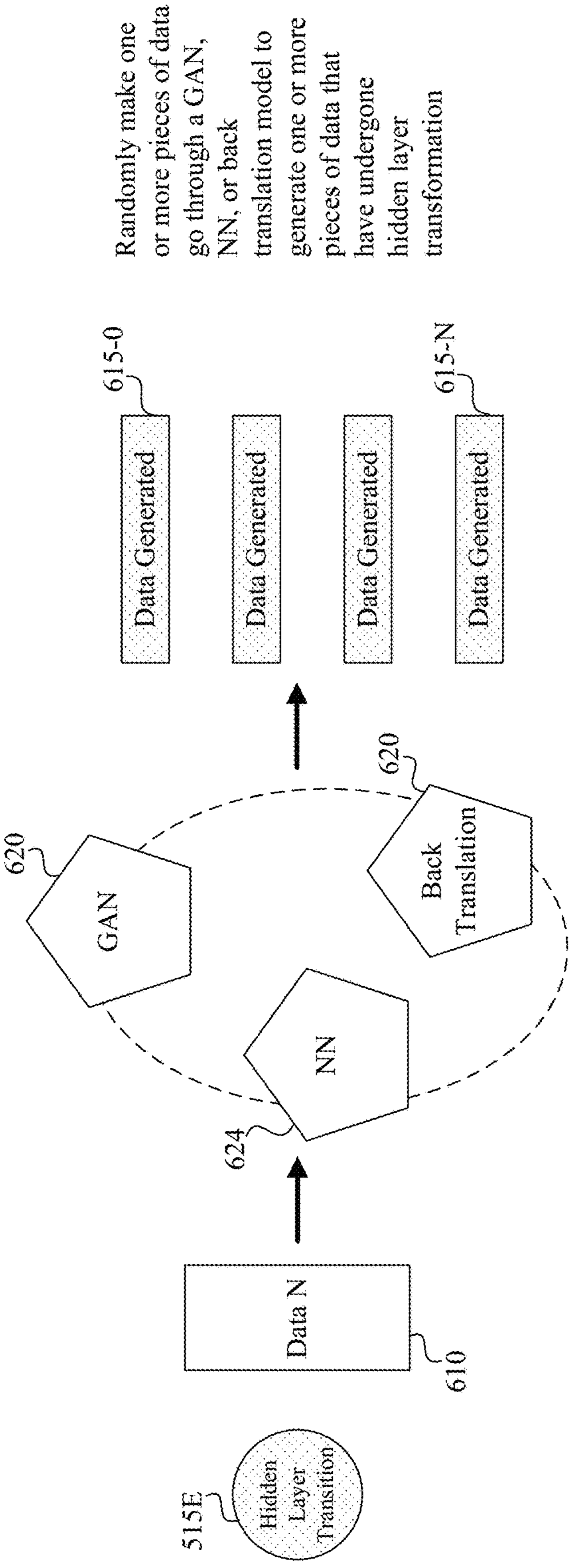

FIG. 6E illustrates the atomic operation of Hidden Layer Transition 515E. In Hidden Layer Transition 515E, a data element 610 is subject to one or more random translations to generate one or more additional data elements 615 for the dataset. Although not limited to these specific types of translations, example transformations can include Generative Adversarial Network (GAN) 620, back translation 622, and Neural Network (NN) 624. The Hidden Layer Transition 515E atomic operation is not limited as to the number/percentage of data elements 610 being translated. For example, a random percentage or a predefined percentage of data elements 610 can undergo translation.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 7:
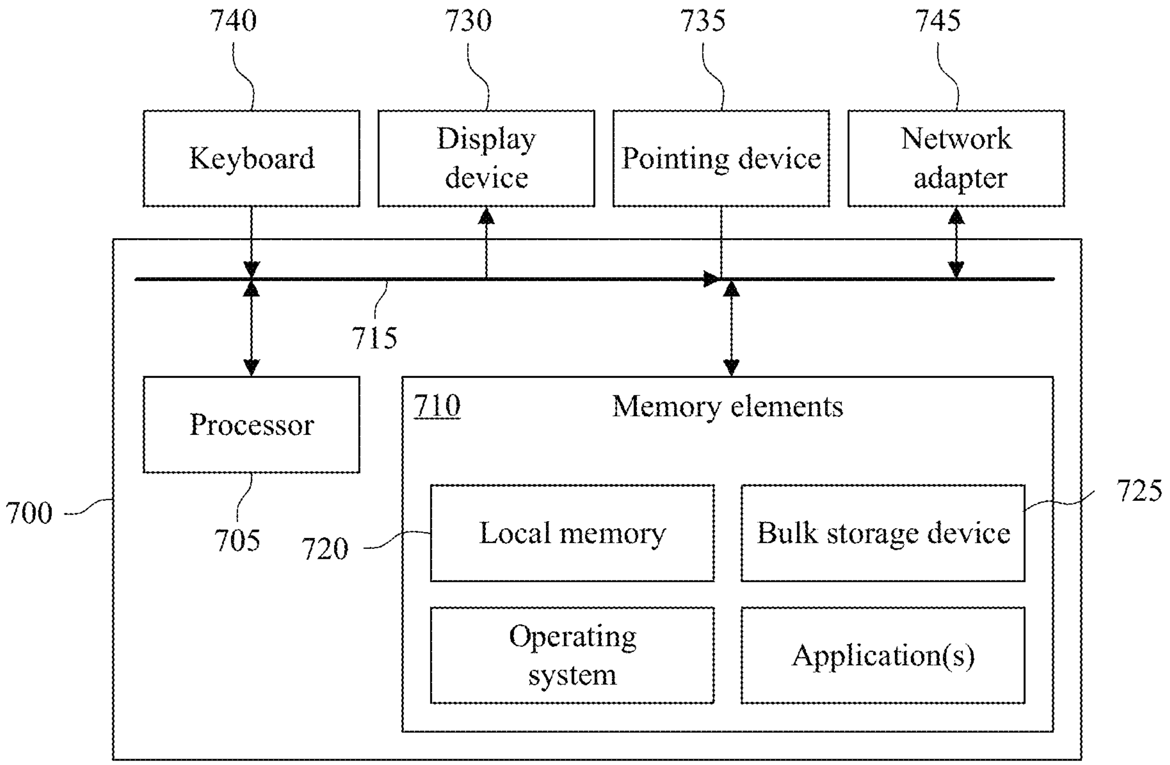
FIG. 7 is a block diagram illustrating an example of computer hardware system for implementing the scanning service of FIG. 3.

FIG. 7 is a block diagram illustrating example architecture for a data processing service used to implement the methodologies illustrated in FIGS. 1 and 3. The data processing system 700 can include at least one processor 705 (e.g., a central processing unit) coupled to memory elements 710 through a system bus 715 or other suitable circuitry. As such, the data processing system 700 can store program code within the memory elements 710. The processor 705 can execute the program code accessed from the memory elements 710 via the system bus 715. It should be appreciated that the data processing system 700 can be implemented in the form of any system including a processor and memory that is capable of performing the functions and/or operations described within this specification. For example, the data processing system 700 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The data processing system 700 also can include one or more cache memories (not shown) that provide temporary storage of at least some program code in order to reduce the number of times program code must be retrieved from the local memory 720 and/or bulk storage device 725 during execution.

Input/output (I/O) devices such as a display 730, a pointing device 735 and, optionally, a keyboard 740 can be coupled to the data processing system 700. The I/O devices can be coupled to the data processing system 700 either directly or through intervening I/O controllers. For example, the display 730 can be coupled to the data processing system 700 via a graphics processing unit (GPU), which may be a component of the processor 705 or a discrete device. One or more network adapters 745 also can be coupled to data processing system 700 to enable the data processing system 700 to become coupled to other systems, computer systems, remote printers, and/or remote storage devices through intervening private or public networks. Modems, cable modems, transceivers, and Ethernet cards are examples of different types of network adapters 745 that can be used with the data processing system 700.

As pictured in FIG. 7, the memory elements 710 can store the components of the selection strategy generator 400 of FIG. 4. Being implemented in the form of executable program code, these components of the data processing system 700 can be executed by the data processing system 300 and, as such, can be considered part of the data processing system 700.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
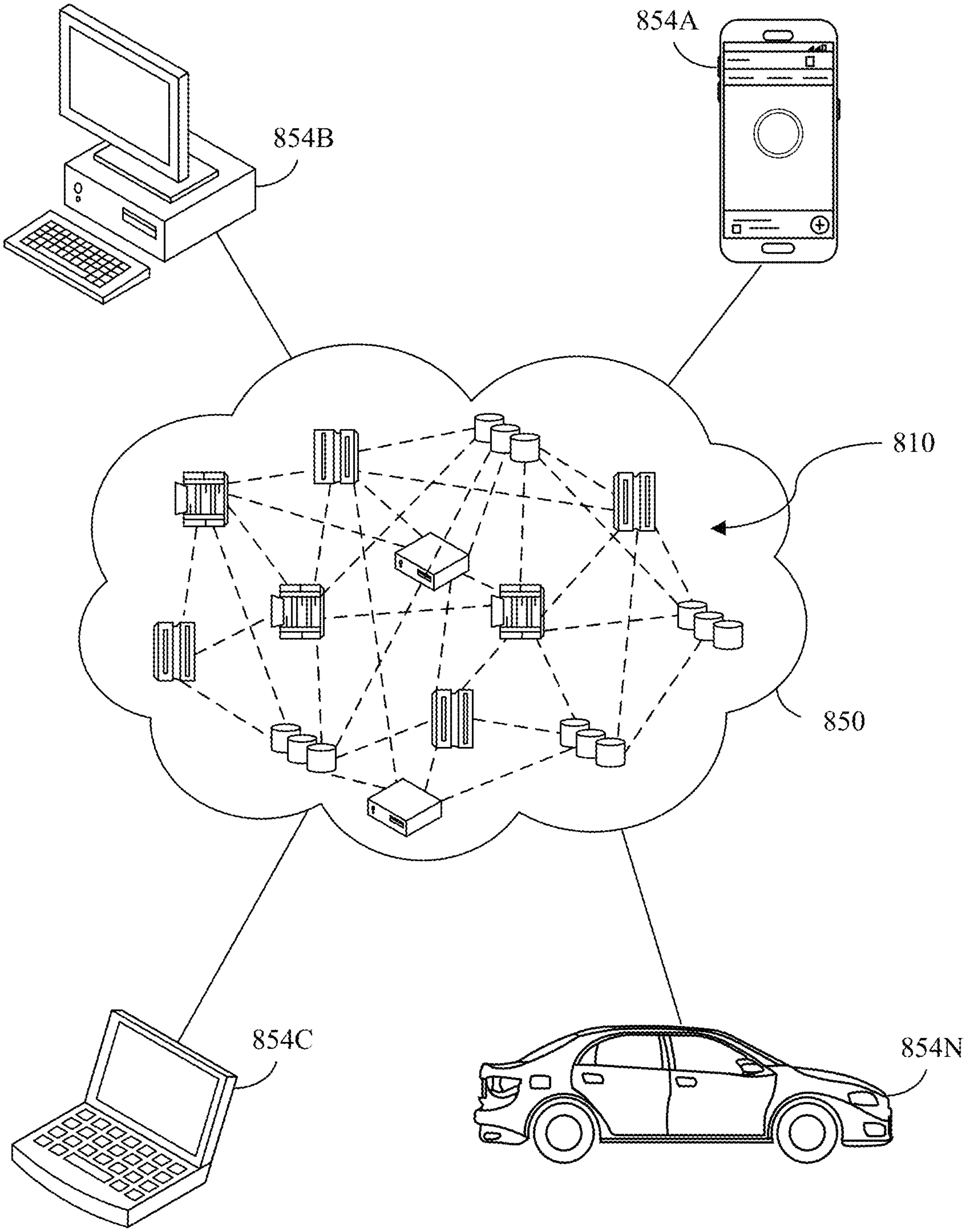
FIG. 8 depicts a cloud computing environment according to an embodiment of the present invention.

Referring now to FIG. 8, illustrative cloud computing environment 850 to be used with machine learning is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
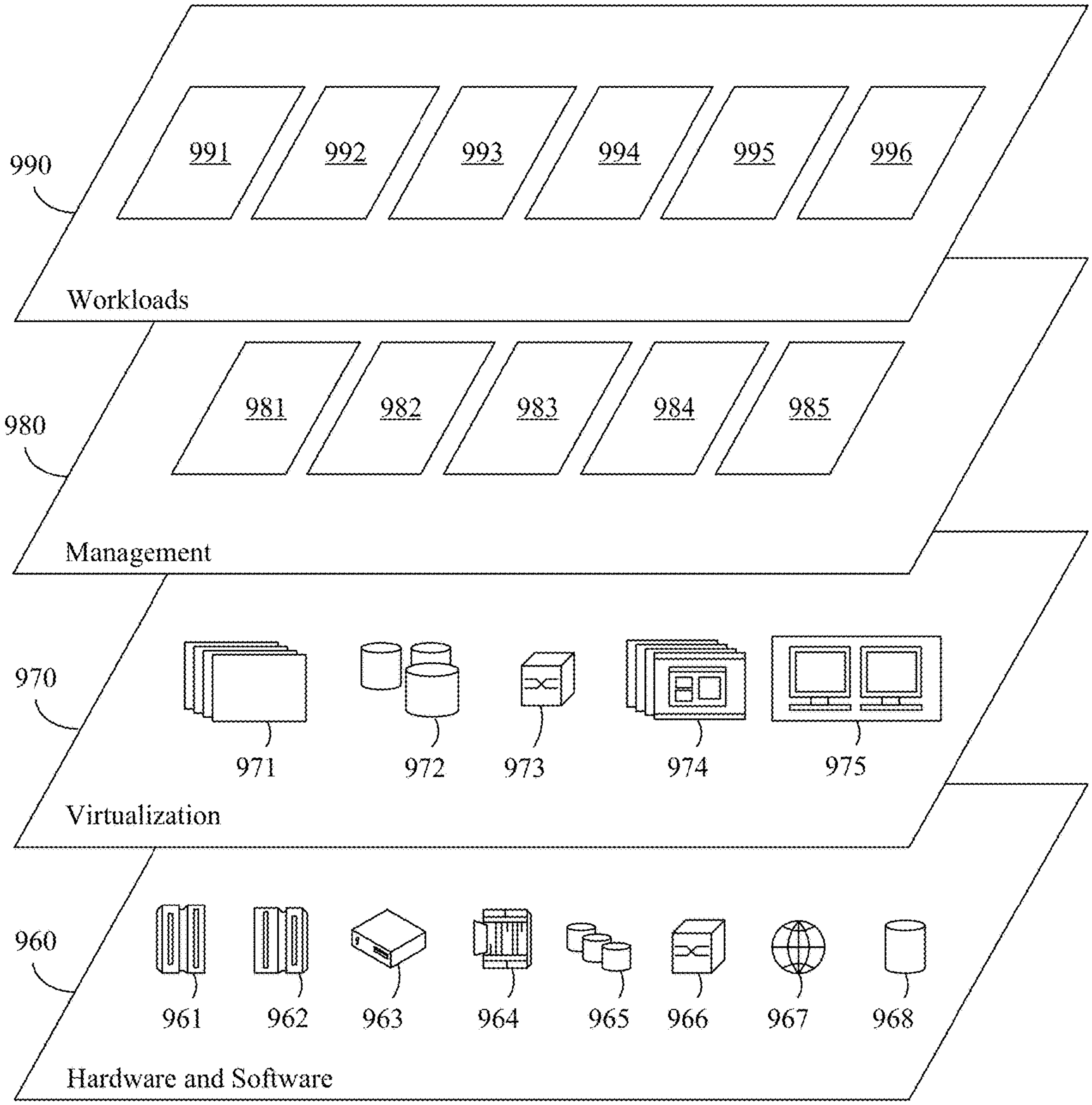
FIG. 9 depicts abstraction model layers according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and operations of the selection strategy generator 996.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method for modifying a training dataset, comprising:
- benchmarking the training dataset using a State Of The Art (SOTA) neural network to determine a benchmark for the training dataset;
- dividing the training dataset into a plurality of slices;
- selecting, using a selection strategy generator operating on one of the plurality of slices, a sequence of a plurality of atomic operations;
- applying the sequence of the plurality of atomic operations to modify the one of the plurality of slices to generate a revised one of the plurality of slices;
- performing reverse reinforcement learning on the revised one of the plurality of slices using the benchmark and the SOTA neural network, wherein the benchmark corresponds to an accuracy of the SOTA neural network using the revised one of the plurality of slices, and wherein a reward corresponding to the reverse reinforcement learning is generated based at least in part on a difference between the accuracy of the SOTA neural network using the revised one of the plurality of slices and the accuracy of the SOTA neural network using the one of the plurality of slices;
- modifying the training dataset by replacing the one of the plurality of slices with the revised one of the plurality of slices to generate a modified training dataset; and
- training the SOTA neural network using the modified training dataset.

2. The method of claim 1, wherein
the reverse reinforcement learning includes:
the SOTA neural network being an environment, and
the modifying the one of the plurality of slices being an action.

3. The method of claim 1, wherein
the selection strategy generator includes a long short term memory (LSTM) neural network and a conditional random field (CRF) layer.

4. The method of claim 3, wherein
the sequence of the plurality of atomic operations generated by the selection strategy generator includes at least one of a group consisting of: a mask atomic operation and an out of order atomic operation.

5. The method of claim 3, wherein
the sequence of the plurality of atomic operations generated by the selection strategy generator includes at least one of a group consisting of: a data deletion atomic operation, a data copy atomic operation, and a hidden layer transition atomic operation.

6. The method of claim 1, wherein
the performing the reverse reinforcement learning is performed for a plurality of iterations.

7. The method of claim 1, wherein
the plurality of slices includes more than two slices,
at least two of the plurality of slices are modified, and one of the plurality of slices is unmodified.

8. A system, comprising:
one or more processors; and
one or more memory devices coupled to the one or more processors, wherein the one or more processors are configured to:
- perform benchmarking of a training dataset using a State Of The Art (SOTA) neural network to determine a benchmark for the training dataset;
- divide the training dataset into a plurality of slices;
- select, using a selection strategy generator operating on one of the plurality of slices, a sequence of a plurality of atomic operations;
- apply the sequence of the plurality of atomic operations to modify the one of the plurality of slices to generate a revised one of the plurality of slices;
- perform reverse reinforcement learning on the revised one of the plurality of slices using the benchmark and the SOTA neural network, wherein the benchmark corresponds to an accuracy of the SOTA neural network using the revised one of the plurality of slices, and wherein a reward corresponding to the reverse reinforcement learning is generated based at least in part on a difference between the accuracy of the SOTA neural network using the revised one of the plurality of slices and the accuracy of the SOTA neural network using the one of the plurality of slices; and
- modify the training dataset by replacing the one of the plurality of slices with the revised one of the plurality of slices to generate a modified training dataset.

9. The system of claim 8, wherein
the reverse reinforcement learning includes:
the SOTA neural network being an environment, and
modifying the one of the plurality of slices being an action.

10. The system of claim 8, wherein
the selection strategy generator includes a long short term memory (LSTM) neural network and a conditional random field (CRF) layer.

11. The system of claim 10, wherein
the sequence of the plurality of atomic operations generated by the selection strategy generator includes at least one of a group consisting of: a mask atomic operation and an out of order atomic operation.

12. The system of claim 10, wherein
the sequence of the plurality of atomic operations generated by the selection strategy generator includes at least one of a group consisting of: a data deletion atomic operation, a data copy atomic operation, and a hidden layer transition atomic operation.

13. The system of claim 8, wherein the one or more processors are further configured to:

perform the reverse reinforcement learning for a plurality of iterations.

14. The system of claim 8, wherein the plurality of slices includes more than two slices, at least two of the plurality of slices are modified, and one of the plurality of slices is unmodified.

15. A non-transitory computer-readable medium storing a set of instructions for training a training dataset, the set of instructions comprising:

one or more instructions that, when executed by one or more processors of a device, cause the device to:

perform benchmarking of the training dataset using a State Of The Art (SOTA) neural network to determine a benchmark for the training dataset;

divide the training dataset into a plurality of slices;

select, using a selection strategy generator operating on one of the plurality of slices, a sequence of a plurality of atomic operations;

apply the sequence of the plurality of atomic operations to modify the one of the plurality of slices to generate a revised one of the plurality of slices;

perform reverse reinforcement learning on the revised one of the plurality of slices using the benchmark and the SOTA neural network, wherein the benchmark corresponds to an accuracy of the SOTA neural network using the revised one of the plurality of slices, and wherein a reward corresponding to the reverse reinforcement learning is generated based at least in part on a difference between the accuracy of the SOTA neural network using the revised one of the plurality of slices and the accuracy of the SOTA neural network using the one of the plurality of slices;

modify the training dataset by replacing the one of the plurality of slices with the revised one of the plurality of slices to generate a modified training dataset; and train the SOTA neural network using the modified training dataset.

16. The non-transitory computer-readable medium of claim 15, wherein the reverse reinforcement learning includes:

the SOTA neural network being an environment, and modifying the one of the plurality of slices being an action.

17. The non-transitory computer-readable medium of claim 15, wherein the selection strategy generator includes a long short term memory (LSTM) neural network and a conditional random field (CRF) layer.

18. The non-transitory computer-readable medium of claim 17, wherein the sequence of the plurality of atomic operations generated by the selection strategy generator includes at least two of a group consisting of: a mask atomic operation, an out of order atomic operation, a data deletion atomic operation, a data copy atomic operation, and a hidden layer transition atomic operation.

19. The non-transitory computer-readable medium of claim 15, wherein the performing the reverse reinforcement learning is performed for a plurality of iterations.

20. The non-transitory computer-readable medium of claim 15, wherein the plurality of slices includes more than two slices, at least two of the plurality of slices are modified, and one of the plurality of slices is unmodified.

* * * * *